United States Patent [19]

Maly et al.

[11] 4,348,707

[45] Sep. 7, 1982

[54] ANTI ERASE INTERLOCK FOR A MAGNETIC TAPE CASSETTE

[75] Inventors: Heinrich Maly; Franz Werner, both of Vienna, Austria

[73] Assignee: U.S. Philips Corporation, New York, N.Y.

[21] Appl. No.: 51,609

[22] Filed: Jun. 25, 1979

[30] Foreign Application Priority Data

Jul. 13, 1978 [AT] Austria ................................ 5074/78

[51] Int. Cl.³ ..................... G11B 23/04; G11B 15/04
[52] U.S. Cl. ....................................... 360/132; 360/60
[58] Field of Search .......................... 360/132, 60, 66; 242/197-200

[56] References Cited

U.S. PATENT DOCUMENTS 3,828,363 8/1974 Somers ............................. 360/132 X
3,950,786 4/1976 Shapley ............................... 360/132
4,041,537 8/1977 Kishi ................................ 360/132 X

FOREIGN PATENT DOCUMENTS 2604172 11/1977 Fed. Rep. of Germany ...... 360/132

Primary Examiner—John H. Wolff
Attorney, Agent, or Firm—David R. Treacy

[57] ABSTRACT

A magnetic tape cassette for a tape recorder, having at least one erase interlock device including an actuating member movable over a defined path in the cassette between a operating position in which an opening in the housing is uncovered, and a position in which the opening is closed. The cassette includes at least one latching element preventing movement from a third position and either of the first two positions. Preferably the latch is movable, and in addition the interlock may be set in a fourth position from which it can be moved only upon disassembly of the cassette.

4 Claims, 3 Drawing Figures

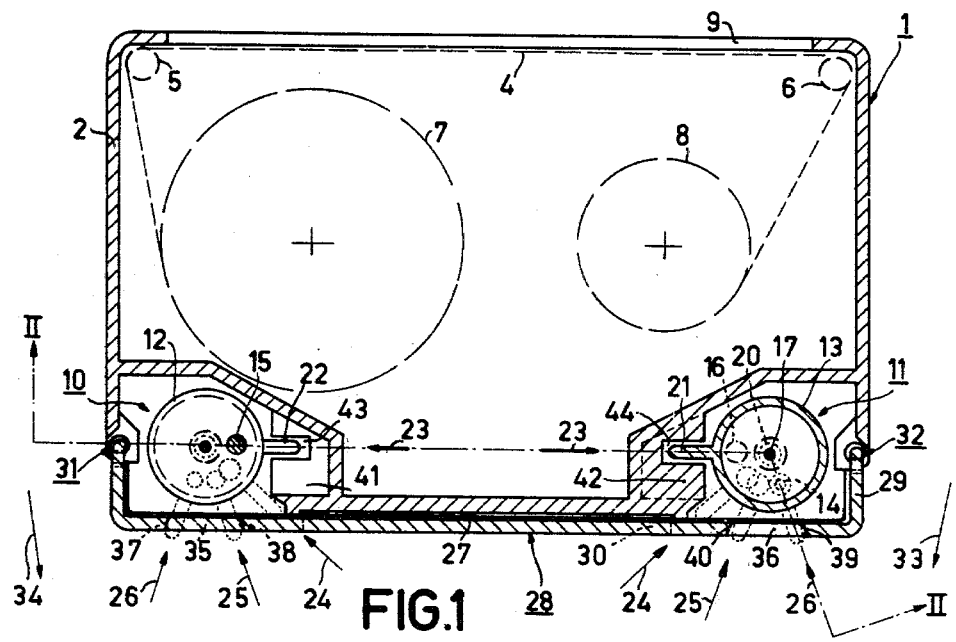
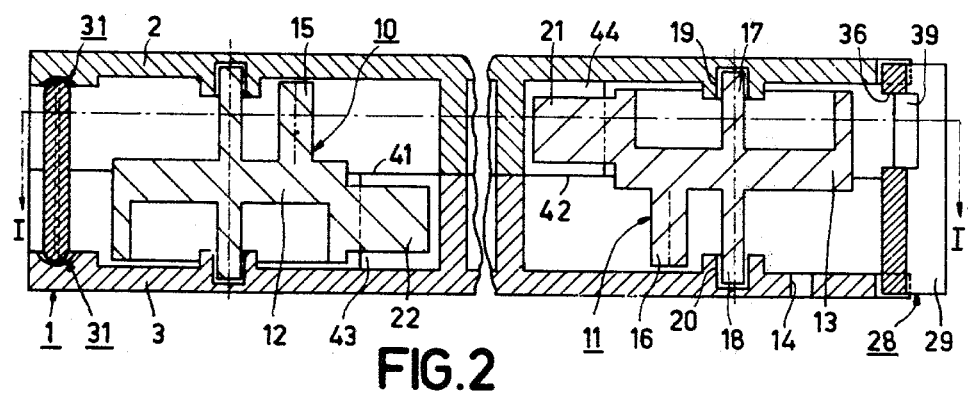
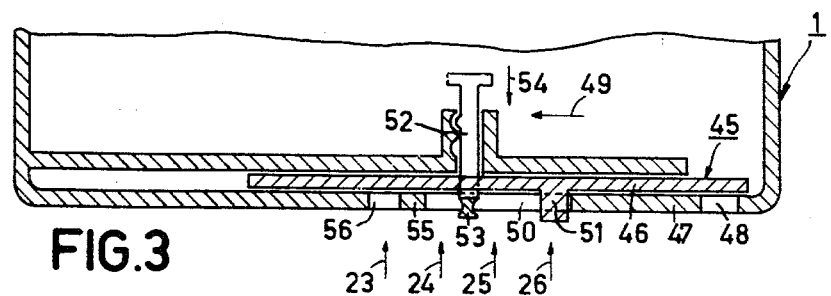

ANTI ERASE INTERLOCK FOR A MAGNETIC TAPE CASSETTE

BACKGROUND OF THE INVENTION

The invention relates to a magnetic tape cassette for a recording and/or reproducing apparatus (hereinafter referred to as a tape recorder); containing a magnetic tape which is disposed substantially between two housing halves of the cassette, which cassette in order to prevent inadvertent erasure of a prerecorded magnetic tape is provided with at least one erase interlock device which comprises an actuating member movable over a defined path in the cassette to at least two normal operating positions which alternatively close or unblock an opening formed in one of the housing halves. Such a cassette is placed on an apparatus which is provided with a sensor, interlocked with a recording control, which sensor senses the opening and is movable between a first position corresponding to a first operating position of the actuating member, in which position the recording control may be switched to its recording position and a second position corresponding to a second operating position of the actuating member, in which position the recording control is locked in its inactive position.

In a known cassette of this type, as is for example described in German Offenlegungsschrift 2,604,172, the actuating member of the erase interlock device is simply movable between two operating positions, the erase interlock being operative in one of the two operating positions and inoperative in the other position. When designing an erase-interlock device care must be taken that its actuating member cannot inadvertently be set to that operating position in which a recording control can be switched to the recording mode, so as to prevent inadvertent erasure of a prerecorded tape. Therefore, as is known from German Offenlegungsschrift No. 2,616,895, it has been proposed to provide the actuating member of an erase-interlock device with a latching device which can only be released deliberately, so as to prevent accidental disabling of the erase interlock device. This increases the reliability with which such an erase interlock device operates, but it also complicates the operation of said device, which is not an advantage in situations where it is desirable that the erase interlock device can be actuated simple and quickly.

SUMMARY OF THE INVENTION

It is an object of the invention to provide such a construction of a magnetic tape cassette that the reliability of operation of the erase interlock device can simply be adapted to the relevant conditions of use.

A magnetic tape cassette is characterized, in accordance with the invention, in that the actuating member (12,13) can be set to at least one further operating position (23,24), in which operating position, if the cassette is disposed on an apparatus, the sensor occupies the second position (no erase) and a latching element (38,40;41,42) is situated in the path between the further operating position and the first two normal operating positions (25,26), so as to prevent an inadvertent movement of the actuating member. Thus, the erase interlock device can simply be changed over between the two firstmentioned operating positions, in which the interlock device is operative in the one case and inoperative in the other case; while in the further operating position, in which the interlock is also operative, the latching member provides effective protection against inadvertent resetting of the erase interlock device. In this way the reliability of operation of the erase interlock device can be changed or selected. This choice is advantageous in many fields of application of such a cassette.

In a preferred embodiment the latching member is constituted by a latch which is movable out of the path of the actuating member. Moving the latch demands an additional deliberate operation, which affords a substantially better protection against inadvertent resetting of the erase interlock device. In this respect it is advantageous that the latch be constituted by a stop on a movable cover means of the cassette. Thus the attention of the user of such a cassette is drawn to the presence of the erase interlock device, so that the user can deliberately set this device to the desired operating position.

On a second preferred embodiment the latching member is constituted by a projection which is rigidly connected to at least one housing half and the actuating member can only be set to the further operating position when the two housing halves of the set are disassembled. Inadvertent recording on such a cassette is absolutely impossible, unless the user disassembles the cassette and resets the erase interlock device, but such an operation can definitely not be effected inadvertently. Such a step is especially advisable for the manufacture of prerecorded cassettes, which are not intended to be erased.

Furthermore, it is found advantageous if the actuating member (12, 13) can be set to two further operating positions (23,24). A latch (38,40) is movable into a position between a first further operating position (24) and one of the two normal operating positions (25,26) of the actuating member; and a projection (41,42), which is rigidly connected to at least one housing half (3,2) lies between the first further operating position and the second further operating position (23), in the path of the actuating member. This embodiment provides both high reliability of operation of the erase interlock device and universal application, because the erase interlock device is rendered operative during assembly of the cassette, or may be latched in the operating position with the latch, or may simply be used without any special precautions.

The invention will now be described with reference to the drawing which shows two embodiments of the invention, but to which the invention is not limited.

BRIEF DESCRIPTION OF THE DRAWINGS

FIG. 1 shows a reversible magnetic tape cassette having two erase interlock devices, whose actuating members are constituted by rotatable parts, in a cross-section parallel to a major surface of the cassette.

FIG. 2 on an enlarged scale shows a cross-section taken on the line II—II in FIG. 1.

FIG. 3 shows a cross-section of a part of a magnetic tape cassette with an erase interlock device, in a second embodiment, the actuating member being constituted by a slide.

DESCRIPTION OF THE PREFERRED EMBODIMENTS

FIGS. 1 and 2 show a reversible magnetic tape cassette 1, which comprises two housing halves 2 and 3. This cassette accommodates a magnetic tape 4 as a record carrier for audio and/or video signals, which tape extends from a first reel 7 to a second reel 8, via guide elements 5 and 6, the tape being passed along the narrow side of the cassette. At least one opening 9 is formed in the narrow side through which the magnetic tape can either be pulled out of the cassette, so as to bring this tape into contact with magnetic heads, or through which magnetic heads can penetrate the cassette so as to cooperate with the magnetic tape. Depending on which housing half and its respective major surface faces the real drive spindles when the cassette is placed on a recording tape recorder, the magnetic tape then being moved either from reel 7 to reel 8 or in the reverse direction from reel 8 to reel 7, the magnetic heads cover different tracks on the magnetic tape. In view of these two possible operating positions of the cassette on the apparatus, the cassette includes two erase interlock devices 10 and 11, each of these devices corresponding to one of these two operating positions.

Each of the two erase interlock devices 10 and 11 comprises an actuating member 12 and 13 respectively and an opening formed in the major surface of one of the two housing halves 2 or 3 and associated with the relevant actuating member, FIGS. 1 and 2 only showing the opening 14 in the housing half 3. These openings are exposed or closed by the relevant actuating member, for which purpose these members each comprise a pin-shaped projection 15 and 16 respectively. Depending on whether the relevant opening is exposed or closed, the corresponding erase interlock device 10 or 11 will be operative or inoperative, assuming in the present case that an erase interlock device is operative when the relevant opening is exposed and is inoperative when the relevant opening is closed. These openings are sensed by a sensor in the tape recorder, which is movable between two positions, the sensor detecting a closed opening in a first position and a free opening in a second position. The opening 14 is sensed when the cassette is disposed on the apparatus with the major surface of the housing half 3, whereas the opening in the half 3, not shown in FIGS. 1 and 2, is sensed when the cassette is disposed on the apparatus with the major surface of the housing of 2. If the sensor detects a free opening, it blocks a recording control of the apparatus, to which control it is coupled, in its inactive position, so that recording is prevented. However, when the sensor detects a closed opening, it releases this interlock, so that the recording control may be switched to the recording position and recording is possible. It is obvious that a reverse method of operation may also be chosen.

Hereinafter mainly the erase interlock device 11 is described in more detail. The erase interlock device 10 is of identical construction. The actuating member 13 of the erase interlock device 11 comprises a cylindrical portion, which is journalled in the housing halves 2 and 3 by journals 17 and 18 at bearing locations 19 and 20 respectively, so as to be rotatable over a circular path thus defined. On this cylindrical portion the pin-shaped projection 16 is formed, which closes the opening 14 in the housing half 3, when recording is to be permitted. Furthermore, the cylindrical portion comprises a radially projecting tab 21, which serves as a handle for moving the actuating member 13. The corresponding tab on the actuating member 12 of the erase interlock device 10 is designated 22. In the present example the projection 16 and the tab 21 are arranged on the rotatable actuating member 13 in line with each other, so that the position or angle of the tab 21 is also indicative of the position of the projection 16 relative to the opening 14. In FIGS. 1 and 2 the actuating member 13 is represented in a position in which the projection 16 does not close the opening 14, so that the erase interlock device is operative. This position of the actuating member 13, as well as the corresponding position of the actuating member 12, is symbolically represented by an arrow 23.

The requirements imposed on such an erase interlock device in respect of it reliability of operation may differ. It may for example be desirable that the erase interlock device can simply be rendered operative or inoperative by the user of the cassette. However, it may also be desirable to protect the erase interlock device so that this device can only be released by the user of the cassette through an additional operation, so as to avoid inadvertent erasure of a recording if, for example the erase interlock device is accidentally released during storage of the cassette. However, it may also be desirable that the erase interlock device is protected so that the user of the cassette can not inadvertently release the erase interlock device, unless he disassembles the cassette, which demands a special delibrate operation. In order to meet all the above-mentioned requirements, the actuating member of the erase interlock device in the present embodiment can be set to a total of four operating positions, the device being inoperative in one operating position only, which is referred to hereinafter as the first operating position, so that recording on the magnetic tape 4 is possible in this position only. In the three further operating positions of the erase interlock device, hereinafter referred to as the second, third and fourth operating position, the erase interlock device is operative and recording on the magnetic tape 4 is prevented. The erase interlock device may then simply be set by hand from the first to the second operating position by the user of the cassette, while for setting the erase interlock device from the second into the third operating position a latching member in the path of the actuating member should be released, which requires a deliberate operation by the user of the cassette. Setting the erase interlock device from the third to the fourth operating position is possible only when the cassette is disassembled because of the presence of a further latching member, which is also included in the path of the actuating member. In this way the reliability of the erase interlock device each time increases from the second to the third and from the third to the fourth operating position of said device. The afore-mentioned fourth operating position of the erase interlock device is the position already described and represented by the arrow 23. The other three operating positions are schematically represented by the dashed position of the tab 21 and the projection 16, the third operating position being represend by the arrow 24, the second by the arrow 25 and the first by the arrow 26; the same applies to the erase interlock device 10.

In the present example the cassette 1 comprises an external index field 27 on the narrow side of the cassette opposite the opening 9, which field may for example consist of a paper strip, on which the recording on the magnetic tape can be specified. A cover means 28, which comprises a U-shaped bracket 29 which fits around the narrow side of the cassette, has a window 30 at the location of the index field and at the bend free ends is pivotably connectable to the housing halves 2 and 3 by means of spherical latching elements 31 and 32 respectively. In this way, upon release of the latching elements 32 the cover means 28 can be pivoted about the latching elements 31 in the direction of the arrows 33, the cover thus pivoting about an axis perpendicular to the major surfaces of the cassette so as to expose the member 13; or about the latching elements 32 in the direction of the arrow 34 after releasing the latching elements 31, so that in either case the index field becomes accessible. However, if desired the cover means 28 may also be removed completely from the cassette, in which case the two latching devices 31 and 32 should be released.

Adjoining the locations of the erase interlock devices 10 and 11 the cover means 28 furthermore has openings 35 and 36 respectively. In the first and second operating positions the tab 22 of the erase interlock device 10 is turned to extend into the opening 35, and in the first and second operating positions of the device 11 the tab 21 extends into the opening 36, the lateral edges of the openings constituting stops 37, 38 and 39, 40 respectively, which limit the movements of the tabs when these are located in an opening. In this way, the first and second operating positions (26 and 25 respectively) of the two interlock devices 10 and 11 are defined, the actuating members 12 and 13 being simply movable by hand between the two operating positions. As stated previously, the erase interlock devices are inoperative in the first position (26), whereas they are operative in the second operating position (25).

Moreover, the stops 38 and 40 on the cover means 28 each constitute a latching element which prevents the corresponding erase interlock device 10 or 11 from being set to or from the third operating position (24) unless the latching member is moved from the second to the third operating position out of the path of the actuating member. The third operating position of the two erase interlock devices obtained when the tab 22 or 21 is positioned behind the relevant stop 38 or 40 respectively of the cover means 28, as is shown by the dashed lines in FIG. 1. Moving the erase interlock devices from the second into the third operating position is effected after the cover means 28 has been pivoted away, after which the relevant tab 22 or 21 is manually reset and the cover means is refitted onto the cassette and latched thereon. This ensures that the erase interlock devices remain in this third operating position and cannot be moved inadvertently to the second or first operating position without first opening the cover.

For moving the erase interlock device from the third operating position (24) to the fourth operating position (23) there is provided a further latching member in the path of the relevant tab 22 or 21, which is constituted by a fixed projection 41 on the housing half 3 for the erase interlock device 10 and by a fixed projection 42 on the housing half 2 for the erase interlock device 11. In this fourth operating position the tab 22 or 21 fits into a slot 43 or 44 respectively in the relevant projection 41 or 42. As can be seen, the erase interlock devices can only be set to this fourth operating position during assembly of the cassette, the actuating members 12 or 13 being set to the relevant position between the two housing halves 2 and 3 with the tab 22 or 21 respectively. The erase interlock devices can only be moved out of this fourth operating position upon diassembly of the cassette. Thus, this fourth operating position of the erase interlock devices affords the best protection against inadvertent resetting. The housing halves 2 and 3 of the cassette can be assembled by means of a screw-thread or snapped connection. However, the two housing halves may also be sealed to each other, in which case the user of the cassette cannot move the erase interlock devices out of the fourth operating position unless the connection between the two housing halves is broken.

It can be seen that this provides different operating positions for the erase interlock devices, which afford different degrees of protection against inadvertent resetting of the erase interlock. Thus, the user of a cassette may select the degree of protection to be afforded by the erase interlock device. For example if he uses the cassette with the erase interlock device in the second operating position, he can easily change to the first; this may be effective if the cassette is intended for making further recordings. However, if the erase interlock device is set to the third operating position, it is ensured that the erase interlock device cannot be released inadvertently, because for this purpose the latching member in the path of the erase interlock device must be released, which obviously is a deliberate operation. Conversely, it will be effective to set the erase interlock device to the fourth operating position when it is not intended to make any further recordings on the cassette.

In the embodiment of FIG. 3 an erase interlock device 45 is shown, which again has four operating positions (23, 24, 25, 26). However, in this case the actuating member of the erase interlock device is constituted by a slide 46, which like a latch closes an opening 48 formed in a wall 47 of one housing half of the cassette 1 in the inactive operating position 26 of the erase interlock device, as is shown in FIG. 3. For releasing the erase interlock the slide 41 is moved in the direction of the arrow 49, the slide 46 exposing the opening 48. As actuating member a projection 51 on the slide 46 is employed, which projection extends from a further opening 50 formed in the wall 47. Also in this case a latching member is situated in the path of the actuating member, which latching member is constituted by a latch 52 in the cassette which can be set in two positions. A projection 53, which is bent at right angles to the rest of the latch and constitutes a stop, in a first position extends at the location of the opening 50 and thus limits the movement of the actuating member 51, thus defining the second operating position 25 of the erase interlock device. The latch 52 is movable in the direction of the arrow 54 perpendicular to the direction of movement 49 of the slide 46. 54. After such a movement into a second position the projection 53 is situated beyond the path of the actuating member 51, so that the member can be moved as far as the stop 55 at the location of the wall 47. If subsequently the latch 52 is reset to its original first position, the latch 46 can no longer be moved, because it is retained by the stops 53 and 55 in the position which constitutes the third operating position 24 of the erase interlock device. If the erase interlock device is to be returned from the third operating position to the second or the first operating position, the latch 52 must be moved again, which requires a deliberate operation. The third operating position 24 of the erase interlock device thus again affords a high degree of protection, because the erase interlock cannot be disabled inadvertently.

The fourth operating position 23 of the erase interlock device, into which the actuating member can only be moved during assembly of the cassette, is provided by a further opening 56 for the actuating member 51 formed in the wall 47 adjacent the stop 55, with which opening the actuating member 51 can be made to engage before assembly of the housing halves of the cassette. In this fourth operating position 23 the latch 46 is again retained with absolute certainty. The latch 46 can only be moved out of this position after diassembly of the cassette.

It is to be noted that within the scope of the invention several variants are possible, especially in respect of the construction of the actuating member and the function as erase interlock device. The same also applies to the choice of the other operating positions; as an example for the embodiments described there could be provided only a first, second and third operating position or only a first, second and fourth operating position. It is not essential that the fourth operating position, viewed in the direction of movement of the erase interlock device, follows the third operating position; this fourth operating position may also be situated before the first operating position.

What is claimed is:

1. A magnetic tape cassette for a tape recorder, comprising a housing and at least one anti-erase interlock device, said device including an actuating member arranged in the cassette to be movable over a defined path between at least first and second operating positions, in one only of said operating positions said member closing an opening formed in the housing,
   wherein the actuating member is arranged to be settable to at least one further operating position, and the device further includes a latching element for blocking movement of the actuating member, disposed between said further operating position and the first and second operating positions,
   said latching element comprising a projection connected to the cassette housing so arranged as to block movement of the actuating member from the further operating position to said first or second operating positions without disassembly of the cassette.

2. A cassette as claimed in claim 1, wherein said projection is rigidly connected to the cassette housing, so as to block movement to or from the further operating position without disassembly of the cassette.

3. A magnetic tape cassette for a tape recorder, comprising a housing and at least one anti-erase interlock device, said device including an actuating member arranged in the cassette to be movable over a defined path between at least first and second operating positions, in one only of said operating positions said member closing an opening formed in the housing,
   wherein the cassette further includes a cover having a stop portion and being movable between a closed and an open position, and
   the actuating member is arranged to be settable to at least one further operating position, in the closed position of the cover said stop portion being arranged to block movement of the actuating member between said further operating position and the first or second operating positions, in the cover open position said actuating member being settable to any of said positions.

4. A cassette as claimed in claim 3, wherein said device further comprises a fixed latching element comprising a projection connected to the cassette housing so arranged as to block movement of the actuating member from a second further operating position, upon disassembly of the cassette the actuation member being movable between any of said operating positions.

* * * * *